United States Patent
Kelly et al.

(10) Patent No.: US 12,053,855 B2
(45) Date of Patent: Aug. 6, 2024

(54) POWER TOOL WITH ELECTRONIC CONTROL OF MULTIPLE SPEEDS

(71) Applicant: MILWAUKEE ELECTRIC TOOL CORPORATION, Brookfield, WI (US)

(72) Inventors: Mark W. Kelly, Wauwatosa, WI (US); Caleb M. Schober, Milwaukee, WI (US); Tyler L. Graham, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 830 days.

(21) Appl. No.: 16/891,319

(22) Filed: Jun. 3, 2020

(65) Prior Publication Data
US 2021/0008688 A1 Jan. 14, 2021

Related U.S. Application Data

(60) Provisional application No. 62/871,329, filed on Jul. 8, 2019.

(51) Int. Cl.
*B23Q 17/10* (2006.01)
*B24B 23/02* (2006.01)
(Continued)

(52) U.S. Cl.
CPC .............. *B24B 49/10* (2013.01); *B23Q 17/10* (2013.01); *B24B 23/028* (2013.01); *G01P 3/44* (2013.01)

(58) Field of Classification Search
CPC ..... B24B 49/10; B24B 23/028; B24B 37/042; B24B 51/00; G01P 3/44; G01P 3/481;
(Continued)

(56) References Cited

U.S. PATENT DOCUMENTS

2007/0296286 A1* 12/2007 Avenell .................... B25F 5/008
  173/217
2011/0114347 A1* 5/2011 Kasuya ..................... B25F 5/00
  173/2
(Continued)

FOREIGN PATENT DOCUMENTS

| EP | 3421183 A1 * | 1/2019 | .............. B25F 5/001 |
| EP | 3421183 A1 | 1/2019 | |
| WO | 2019091823 A1 | 5/2019 | |

OTHER PUBLICATIONS

ToolGuyd, "New Milwaukee M12 Fuel Right Angle Die Grinder", <https://toolguyd.com/milwaukee-m12-fuel-right-angle-die-grinder/>, published Jun. 10, 2019 (27 pages).

*Primary Examiner* — Jeffrey P Aiello
(74) *Attorney, Agent, or Firm* — Michael Best & Friedrich LLP

(57) ABSTRACT

A power tool including a motor configured to rotatably drive an output shaft, a variable motor speed control input, a motor speed limit input, and a motor controller. The motor controller includes an electronic processor and a memory configured to store instructions. When executed by the motor controller, the instructions configure the motor controller to detect a motor speed limit from a setting of the motor speed limit input, and detect a variable speed control setting from the variable motor speed control input. The motor controller generates a motor speed control signal for driving the motor based on the detected motor speed limit and the detected variable motor speed control setting, and transmits the motor speed control signal to a motor driver circuit configured to drive the motor at a speed based on the motor speed control signal.

17 Claims, 5 Drawing Sheets

(51) Int. Cl.
*B24B 49/10* (2006.01)
*G01P 3/44* (2006.01)

(58) Field of Classification Search
CPC ......... B23Q 17/10; H02P 23/14; H02P 21/18; H02P 6/17; H02P 7/2805; H02P 6/08; H02P 7/2913
USPC .... 173/11, 170, 176, 217; 700/83, 108, 175; 702/145, 1, 33, 57, 60, 64, 79, 85, 96, 702/104, 189
See application file for complete search history.

(56) References Cited

U.S. PATENT DOCUMENTS

| | | | |
|---|---|---|---|
| 2018/0355810 A1* | 12/2018 | Larsson | F02D 41/26 |
| 2018/0363571 A1* | 12/2018 | Larsson | F02D 31/006 |
| 2019/0070721 A1* | 3/2019 | Kawano | B25F 5/00 |
| 2019/0111550 A1* | 4/2019 | Kato | B25F 5/00 |
| 2019/0111551 A1* | 4/2019 | Kato | H02P 29/0016 |
| 2021/0023675 A1* | 1/2021 | Mandl | B24B 47/18 |

* cited by examiner

POWER TOOL WITH ELECTRONIC CONTROL OF MULTIPLE SPEEDS

RELATED APPLICATIONS

This application claims priority to U.S. Provisional Patent No. 62/871,329, filed Jul. 8, 2019, the entire content of which are incorporated by reference herein.

TECHNICAL FIELD

Embodiments described herein relate to power tools, and more particularly to variable speed portable rotary power tools.

BACKGROUND

An angle grinder can be powered by an electric motor that drives various replaceable discs, such as an abrasive disc, a cut-off disc, or a sanding disc, which is sometimes coupled with a backing pad or rigid disc. Angle grinders may run at high operating speeds (e.g., 20,000 revolutions per minute [rpm] or greater). On an angle grinder, the rotational axis of the disc may be at a right or 90-degree angle with respect to a longitudinal axis of the grinder handle. The right angle can enable the grinder to more easily fit into tight spaces and can be more comfortable for some tasks, such as rust removal and polishing, than an inline die grinder. Inline die grinders have a rotational axis coaxial or parallel (i.e., inline) with the longitudinal axis of the grinder handle, and are better suited for some tasks than a right angle grinder.

SUMMARY

Embodiments described herein provide a power tool including a motor configured to rotatably drive an output shaft coupled to the motor, a variable motor speed control input, a motor speed limit input, and a motor controller. The motor controller is connected to the variable motor speed control input and the motor speed limit input. The motor controller includes an electronic processor and a memory configured to store instructions, that when executed by the motor controller configures the motor controller to detect a motor speed limit from a setting of the motor speed limit input, and detect a variable speed control setting from the variable motor speed control input. The motor controller is also configured to generate a motor speed control signal for driving the motor based on the detected motor speed limit and the detected variable motor speed control setting, and transmit the motor speed control signal to a motor driver circuit configured to drive the motor at a speed based on the motor speed control signal.

Embodiments described herein provide a method for operating a power tool. The method includes detecting, by a motor controller a motor speed limit setting output from a motor speed limit input device, and detecting a variable speed control setting output from a variable motor speed control input device. The method further includes generating, by the motor controller, a motor speed control signal for driving a motor configured to rotatably drive an output shaft coupled to the motor, and transmitting the motor speed control signal to a motor drive circuit to drive the motor at a speed based on the motor speed control signal. The motor speed control signal is based on the detected motor speed limit setting and the detected variable motor speed control setting.

Embodiments described herein provide a power tool including a motor configured to rotatably drive an output shaft coupled to the motor, a variable motor speed control input, a motor speed limit input, and a motor controller. The motor controller is connected to the variable motor speed control input device and the motor speed limit input device. The motor controller includes an electronic processor and a memory configured to store instructions, that when executed by the motor controller configures the motor controller to detect a motor speed limit from a setting of the motor speed limit input device, and detect a variable speed control setting from the variable motor speed control input device. The motor controller is also configured to detect a measured motor speed from the motor speed sensor, and compare the measured motor speed to a desired speed based on the motor speed limit setting and the variable motor speed control setting to determine a difference value. The motor controller is also configured to determine a motor speed control signal based on the difference value, and transmit the motor speed control signal to the motor driver circuit.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

Figure 1A:
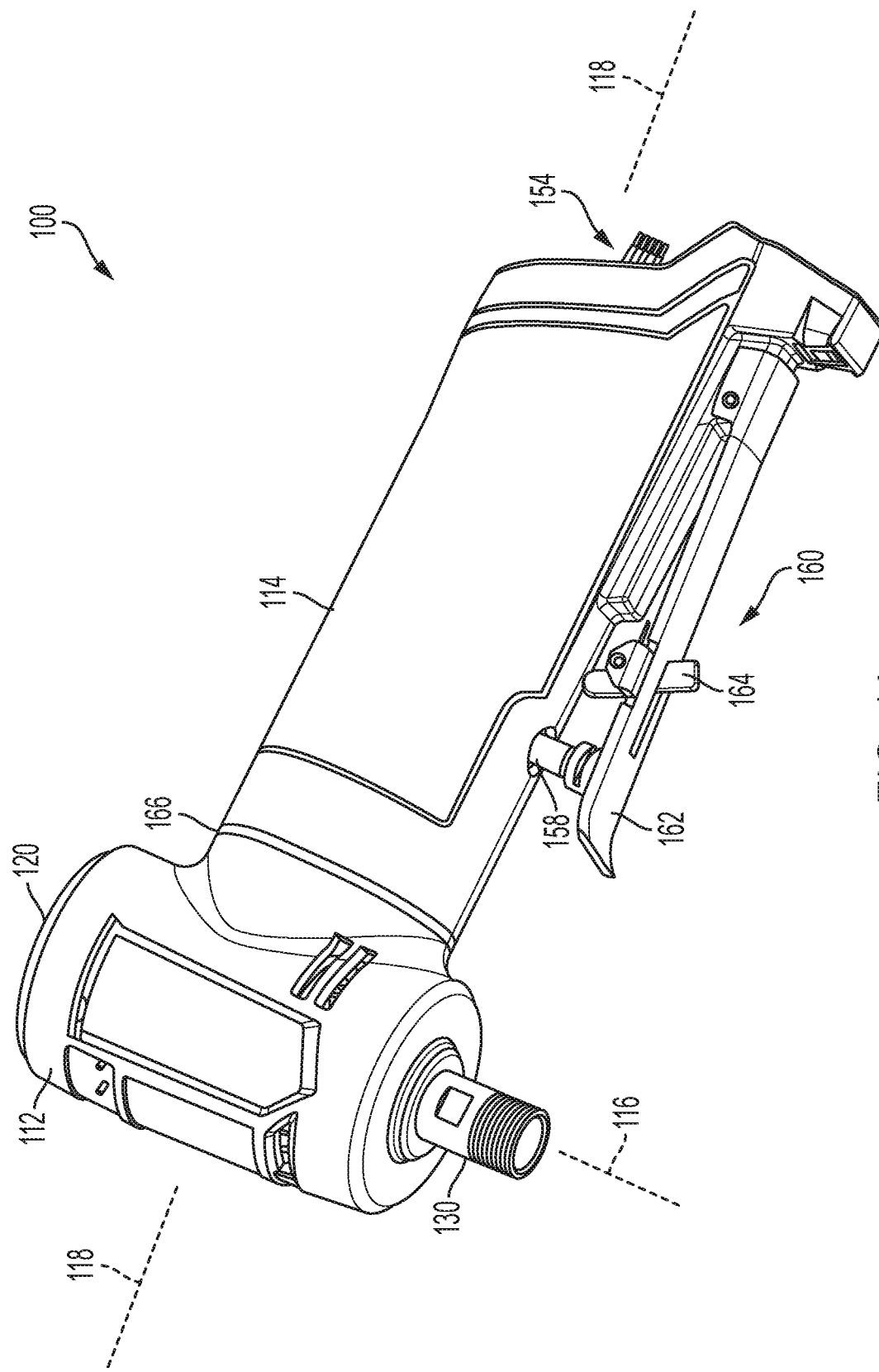
FIG. 1A illustrates a perspective view of a portable rotary power tool that includes a paddle mechanism for variable motor-speed control and a motor-speed limit selector, in accordance with some embodiments.
Figure 1B:
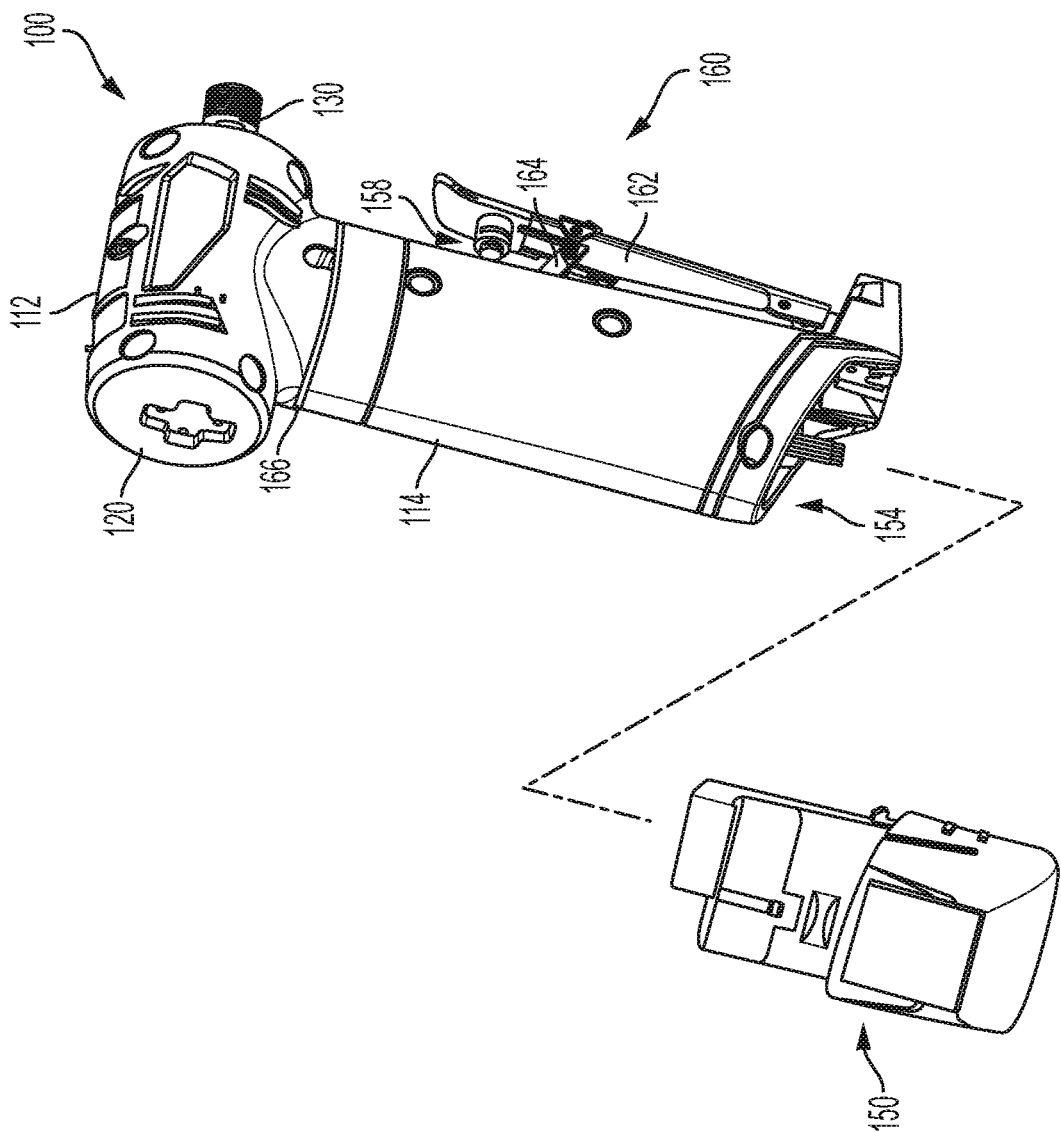
FIG. 1B illustrates a perspective view of a portable rotary power tool that includes a variable motor-speed control, a motor-speed limit selector, and a battery pack, in accordance with some embodiments.

FIGS. 1A-1D illustrates a portable rotary power tool that includes a variable motor-speed control, a motor-speed limit selector, and a battery pack. One example of a portable rotary power tool is a die grinder 100 as shown in FIGS. 1A-1D. The die grinder 100 may be an angle grinder that has a motor housing 112 and a handle 114 that extends transversely from the motor housing 112. The motor housing 112 extends along a first axis 116 (i.e., motor axis), and the handle 114 extends along a second axis 118 that is transverse to the motor axis 116. A motor 110 is located within the motor housing 112. The motor axis 116 is defined by a rotor shaft of the motor 110, which extends longitudinally through the motor housing 112. In some embodiments, the portable rotary power tool is an inline grinder, rather than an angle grinder, wherein the first axis 116 of the motor housing 112 is generally parallel or coaxial with the second axis 118 of the handle 118.

The motor 110 also includes a rotor and a stator that surrounds the rotor (not shown). In some embodiments, the motor 110 is a brushless direct current (DC) motor in which the rotor is a permanent magnet rotor and the stator includes coil windings that are selectively energized to drive the rotor. In other embodiments, the motor is a brushed motor. The stator is supported within the motor housing 112 and remains stationary relative to the motor housing 112 during operation of the die grinder 100. The rotor is rotatably fixed to a rotor shaft and configured to co-rotate with the rotor shaft, relative to the stator, about the motor axis 116. A portion of the rotor shaft defines an output shaft 130 extending from the motor housing 112. The output shaft 130 is coupleable to a tool holder 132 that may be configured to receive an accessory, such as a cutting tool, a grinding disc, a rotary burr, a sanding disc, etc. Various types of accessories may be interchangeably attached to the tool holder 132 and may be designed with different characteristics to perform different types of operations. For example, an accessory may be made of a material and have dimensions suitable for performing a specific type of task. The characteristics of an accessory may affect the performance of the die grinder 100 or may impose constraints on operation of the tool. For example, different accessory types may be configured to work at different rotational speeds or applied torque depending on the characteristics of the accessory and the task at hand. During operation of the die grinder 100, the rotor shaft, and thus the output shaft 130 may rotate at speeds above 20,000 rpm (e.g., 24,500 rpm).

In some embodiments, the handle 114 includes a power supply 150. For example, the handle 114 may define a battery receptacle 154, which is positioned on an end of the handle 114 opposite the motor housing 112. The battery receptacle 154 is configured to selectively, mechanically, and electrically connect to a rechargeable battery pack 150 (i.e., power supply 150) for powering the motor 110. The battery pack 150 is insertable into the battery receptacle 154 such that, when inserted, the battery pack 150 may be oriented along the second axis 118. Alternatively, in another embodiment of the die grinder 100, the battery pack 150 may be slidably coupled to a battery receptacle along an axis that is transverse to the second axis 118. The battery pack 150 may include any of a number of different nominal voltages (e.g., 12V, 18V, etc.), and may be configured having any of a number of different chemistries (e.g., lithium-ion, nickel-cadmium, etc.). In alternative embodiments (not shown), the motor 110 may be powered by a remote power source 150 (e.g., a household electrical outlet) through a power cord and a power interface of the die grinder 100. The handle 114 further contains control electronics 156 for the die grinder 100 (see FIG. 2 for details).

The handle 114 supports a trigger assembly 160 operable to selectively electrically connect the power source 150 (e.g., the battery pack) and the motor 110. The trigger assembly 160 may be a "lock-off" trigger assembly having a paddle member 162 and a lock-off member 164 supported by the paddle member 162. The paddle member 162 is operable to actuate a microswitch 158 (see FIG. 2) to selectively activate and deactivate the motor 110 during operation of the die grinder 100. The lock-off member 164 selectively prevents operation of the paddle member 162. Specifically, the lock-off member 164 is pivotable to selectively lock and unlock the paddle member 162. The speed of the motor 110 may be controlled by varying the level of depression of the paddle member 162.

The die grinder 100 may also include an electronic user input for selecting motor-speed limits. For example, the motor housing 112 or the housing of the handle 114 may support a motor-speed limit selector 120. The motor-speed limit selector 120 is coupled to a motor controller (FIG. 2) and may be set to indicate a limit for the revolutions per minute (RPM) of the motor 110, while the trigger assembly 160 varies the RPM based on a level of depression of the paddle member 162. In other words, the speed is adjustable by user input at the paddle member 162 below the speed limit that is set according to the motor-speed limit selector 120. Different tool accessories (e.g., grinding disc, burr, etc.) may be rated for different maximum speeds. Thus, when a user attaches, for example, a two inch disc with a maximum RPM rating of 24000, the user can select a higher motor-speed limit setting than when the user attaches a larger disc with a lower maximum RPM rating. When a user attempts to increase RPM of the motor above the set speed limit using the paddle member 162, the system controller overrides the paddle member 162 input to prevent the motor from exceeding the motor speed limit set by the motor-speed limit selector 120.

Figure 1D:
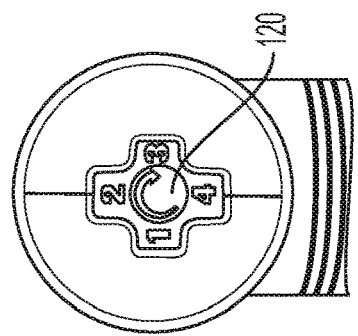
FIG. 1D illustrates a partial rear view of the portable rotary power tool of FIG. 1B, in accordance with some embodiments.
Figure 1C:
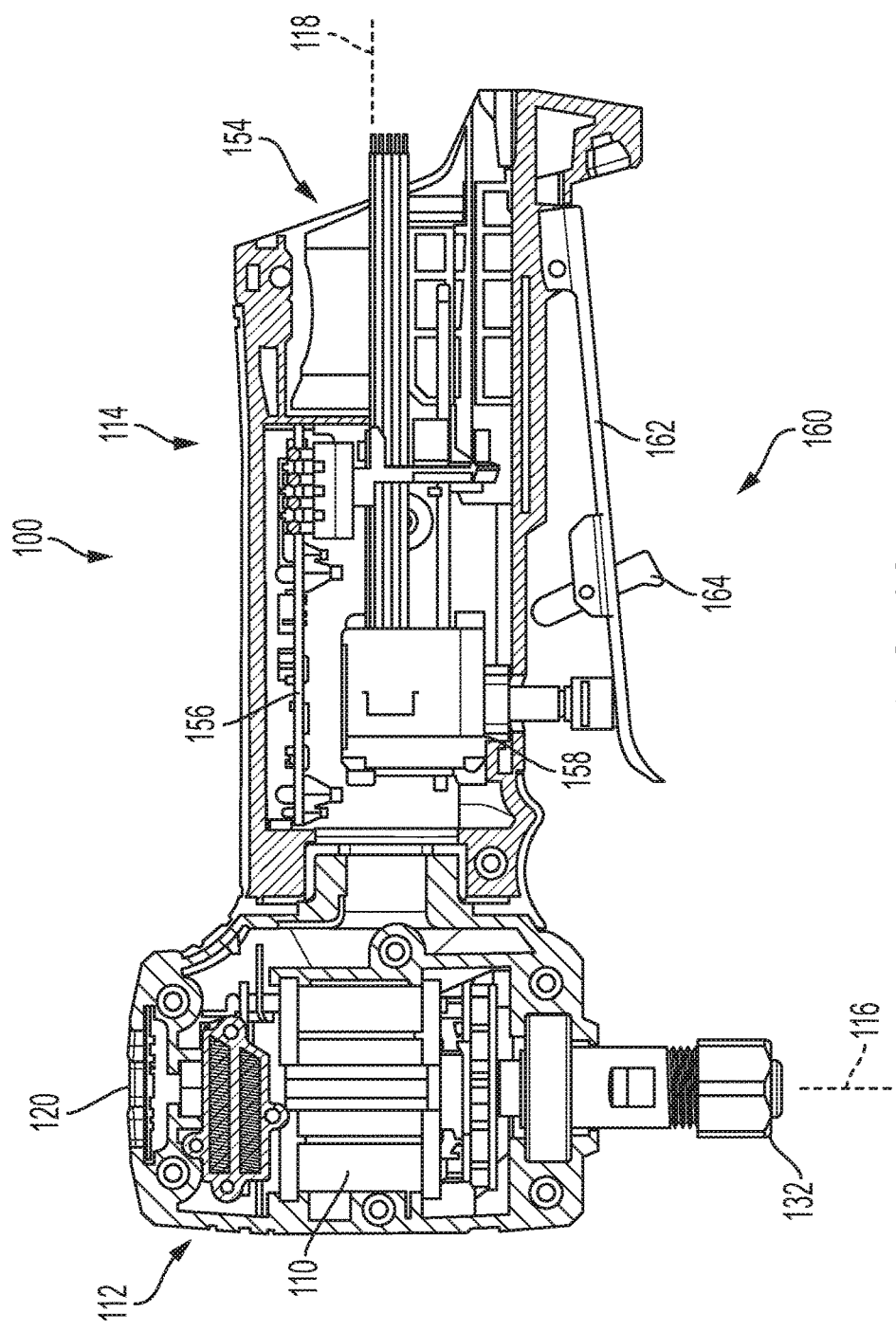
FIG. 1C illustrates a cross section including an example of a portable rotary power tool that has a paddle mechanism for variable speed control and a motor-speed limit selector, in accordance with some embodiments.

In FIGS. 1A-1D, the motor-speed limit selector 120 is shown as a push-button mechanism located on the surface of the motor housing 112 opposite from the output shaft 130 and perpendicular to the first axis 116. As shown in FIG. 1D, in this example, the motor-speed limit selector 120 has four speed limit settings and includes LEDs that illuminate to show the current speed limit setting. Each actuation of the push button 120 changes the motor-speed limit setting to a different level (e.g., 10,000 RPM, 15,000 RPM, 20,000 RPM, and 25,000 RPM). However, the disclosure is not limited to the specific style of speed limit selector, speed level limits (e.g., speed level limits can be set to any desired value), or positioning of the motor-speed limit selector 120, and other suitable mechanisms for setting the speed limit, such as a slide mechanism, a rotating mechanism, buttons, touch screen, or the like may be utilized. By setting a motor speed limit, the motor output can be increased to maintain the selected motor speed (i.e., RPM) limit. Also, limiting the motor speed allows users to do delicate work and accommodate various speed limits for particular accessories driven by the output driver 130.

In some embodiments, the die grinder 100 includes a vibration damping assembly 166 positioned between the motor housing 112 and the handle 114 to attenuate vibration from the motor housing 112. The damping assembly may include a first coupling portion defined by the motor housing 112, a second coupling portion defined by the handle 114, and an elastomeric damper positioned between the first and second coupling portions.

Figure 2:
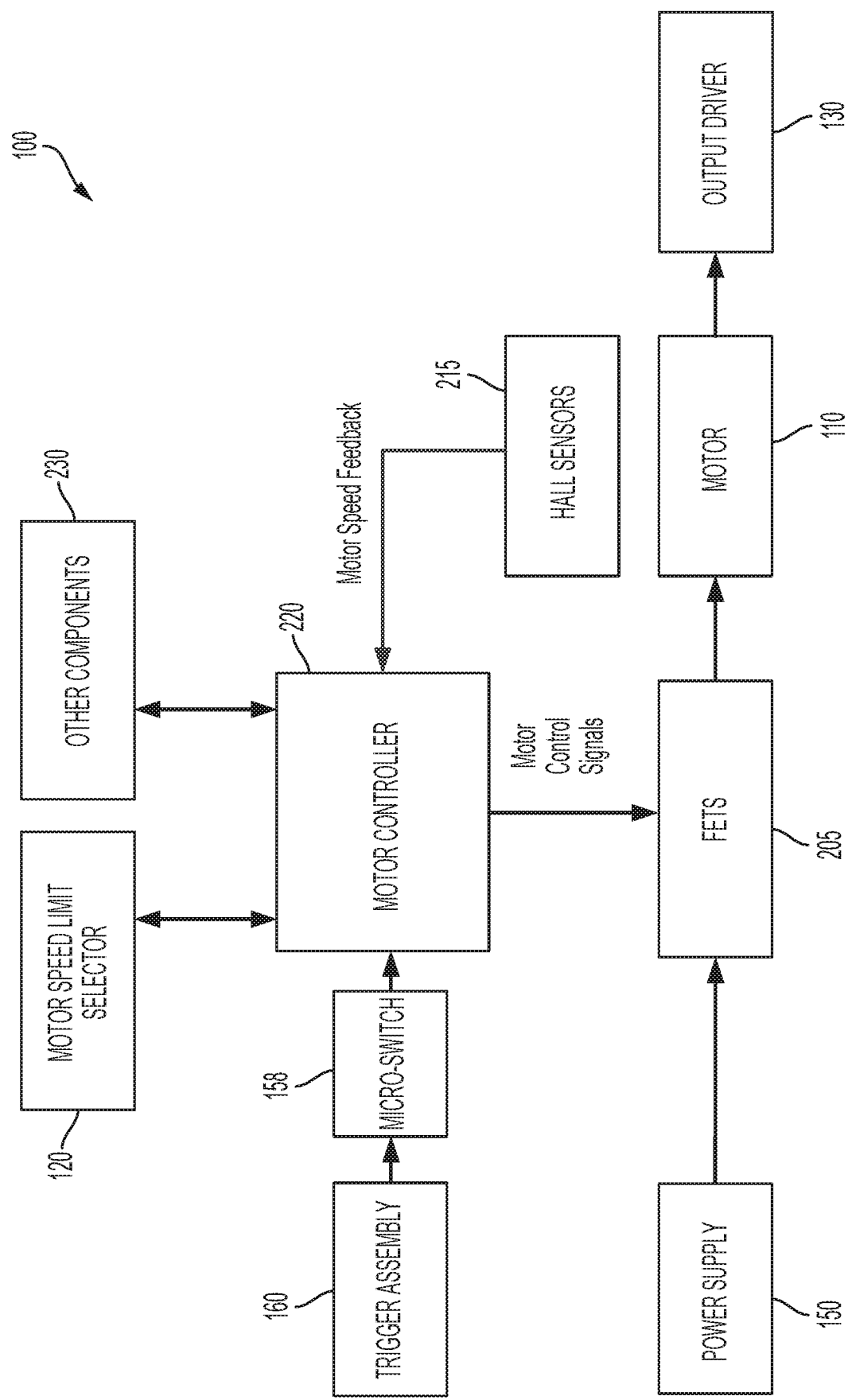
FIG. 2 is a block diagram of a variable speed rotary power tool, in accordance with some embodiments.

FIG. 2 is a block diagram of the variable speed rotary power tool 100 of FIGS. 1A-1D. FIG. 2 includes the power supply 150, a motor driver circuit, such as field effect transistors (FETs) 205, the motor 110, the output shaft 130, Hall sensors 215, a motor controller 220, trigger assembly 160, the motor-speed limit selector 120, and other components 230 (e.g., battery pack fuel gauge, work lights (LEDs), current/voltage sensors, etc.). The Hall sensors 215 provide motor information feedback to the motor controller 220, such as motor rotational position information, which can be used by the motor controller 220 to determine position, velocity, and/or acceleration of the motor 110. The trigger assembly 160, including the paddle member 162, and the motor-speed limit selector 120 are user control mechanisms.

The motor controller 220 includes an electronic processor and a memory storing instructions that, when executed by the electronic processor cause the motor controller 220 to carry out the functionality of the controller described herein. The motor controller 220 is configured to receive input from the trigger assembly 160, such as when the paddle member 162 is depressed by a user, or from actuation of another type of trigger mechanism for varying the motor speed and thus the speed of an accessory attached to the output driver 130. The motor controller 220 is also configured to receive input from the motor-speed limit selector 120 where a selection of a speed limit level on the motor speed limit selector 120 indicates to the motor controller 220 a motor RPM level that is not to be exceeded.

In some embodiments, the speed limitation is controlled electronically rather than using a gear box or mechanical controls. In response to the motor information feedback from the Hall sensors 215 and user control input from the paddle member 162 and motor-speed limit selector 120, the motor controller 220 transmits control signals to accurately control the FETs 205 to drive the motor 110. By selectively enabling and disabling the FETs 205, power received from the power input 150 is selectively applied to the motor 110 to cause rotation of a rotor of the motor 110. The rotating rotor of the motor 110 drives the output driver 130. In some embodiments, the motor speed indicated by the output of the Hall sensors 215 enables the motor controller 220 to implement closed loop speed control. The closed loop speed control enables the motor controller 220 to adjust motor power to maintain an RPM, selected by the motor-speed limit selector 120 and the paddle member 162, as a load on the motor 110 varies during an operation. For example, using the closed loop speed control, the motor controller 220 may increase motor power to maintain a selected maximum RPM when a load is increased. The control signals sent by the motor controller 220 to the FETs 205 may comprise pulse width modulation (PWM) signals that drive the speed of the motor 110 based on a duty cycle of the PWM signals.

The motor controller 220 and other components of die grinder 100 are electrically coupled to and receive power from the power supply 150. The FETs 205, motor 110, Hall sensors 215, motor controller 220, and output driver 130 may be referred to as electromechanical components of the grinder tool 100. As noted above, alternatively, the motor 110 may be powered by a remote power source (e.g., a household AC electrical outlet) through a power cord. Power may be received in the die grinder 100 via a power interface (not shown) connected to the FETs 205 for providing power to the motor 110 according to control by the motor controller 220.

Although described with respect to the example of the die grinder 100 of FIGS. 1A-1D, the block diagram 200 generally applies to other embodiments of the rotary power tool 100. For example, the output driver 130 in the case of a power saw is a saw blade holder (e.g., an arbor), or the output driver 130 in the case of a vacuum is an impeller providing suction force. Further, in some embodiments of the die grinder 100, the die grinder 100 may be a straight or inline grinder.

Figure 3:
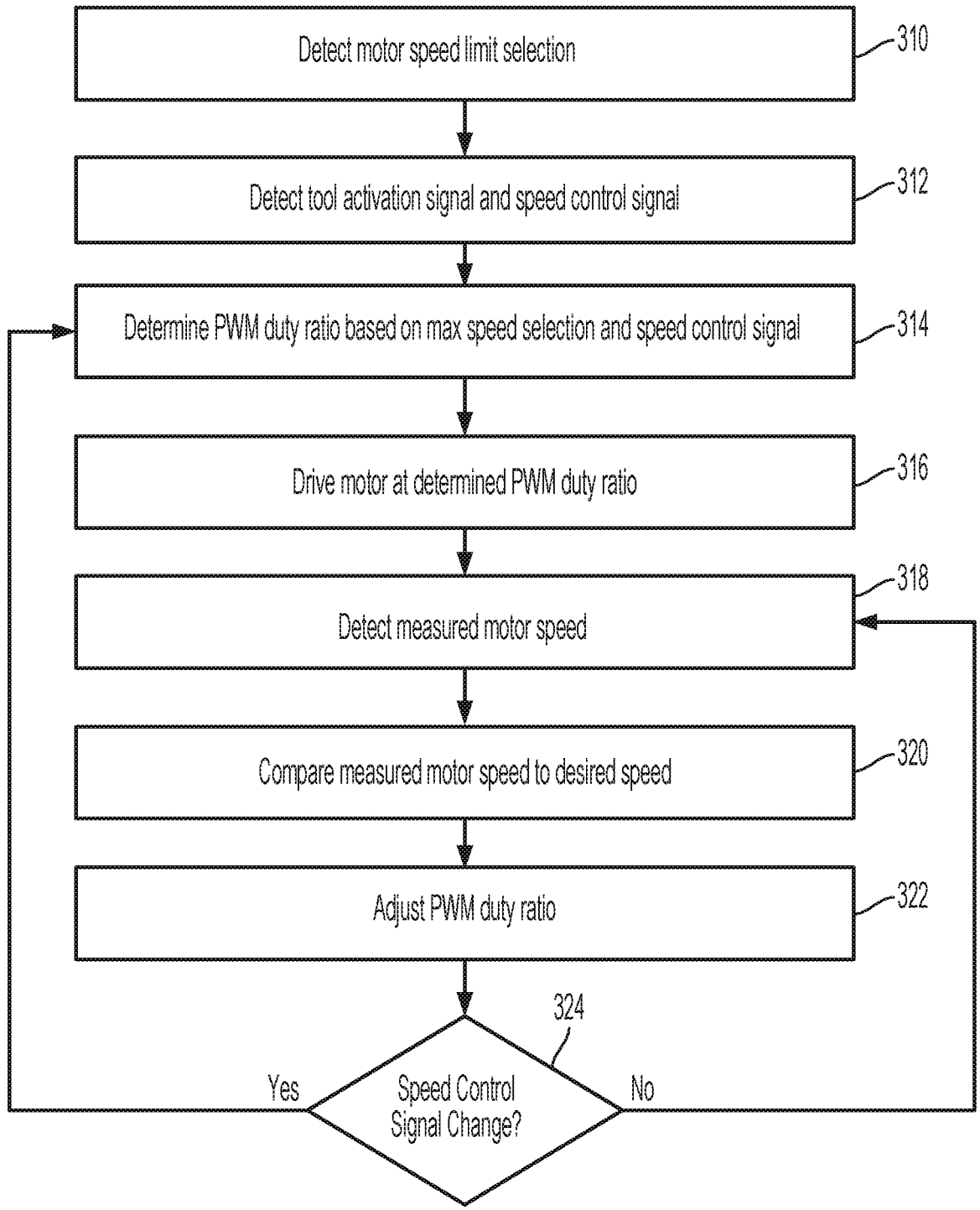
FIG. 3 is a flow chart for controlling the speed of a rotary power tool motor, in accordance with some embodiments.

FIG. 3 is a flow chart for controlling motor-speed of a rotary power tool, for example, an inline grinder or right angle grinder (e.g., the die grinder 100 shown in FIGS. 1A-1D). In step 310, the motor controller 220 detects a user input motor speed limit setting received from the motor-speed limit selector 120. The motor speed limit setting indicates the high-end of a range of RPMs allowed for the motor 110, and thus, for an accessory attached to the output shaft 130 and the tool holder 132. For example, the speed limit would apply to a disc or burr accessory attached to the die grinder 100.

In step 312, the motor controller 220 detects user input for tool activation and motor speed control from the paddle member 162. The motor controller 220 detects the tool activation when the paddle member 162 is depressed and detects variable speed control of the motor 110 according to the level of depression or the distance of the paddle member 162 relative to its initial position. For example, in some embodiments, the microswitch 158 is part of a voltage divider circuit with a potentiometer that outputs a voltage signal (e.g., between 0-5 volts) proportional to the amount of depression of the paddle member 162.

In step 314, the motor controller 220 determines a desired speed and associated pulse width modulation duty cycle for controlling the motor 110 based on the speed control signal input at the paddle member 162 and the motor-speed limit setting input at the motor-speed limit selector 120. For example, the motor controller 220 may store and use a lookup table for each speed limit setting, where the trigger depression amount is used as an index into the lookup table and the desired speed and duty cycle is output.

In step 316, the motor controller 220 drives the motor 110 at the determined duty cycle by transmitting control signals to the FETs 205. For example, in some embodiments, the FETs 205 may include a six-FET bridge, with three high-side FETs and three low-side FETs. The motor controller 220 provides control signals to selectively enable and disable the low and high-side FETs (e.g., sequentially, in pairs) resulting in power from the power supply 150 to be selectively applied to stator coils of the motor 110 to cause rotation of a rotor. More particularly, to drive the motor 110, the motor controller 220 enables a first high side FET and first low side FET pair (e.g., by providing a voltage at a gate terminal of the FETs) for a first period of time. In response to determining that the rotor of the motor 210 has rotated based on a pulse from the Hall sensors 215, the motor controller 220 disables the first FET pair, and enables a second high side FET and a second low side FET. In response to determining that the rotor of the motor 110 has rotated based on pulse(s) from the Hall sensors 215, the motor controller 220 disables the second FET pair, and enables a third high side FET and a third low side FET. In response to determining that the rotor of the motor 110 has rotated based on further pulse(s) from the Hall sensors 215, the motor controller 220 disables the third FET pair and returns to enable the first high side FET and the first low side FET. This sequence of cyclically enabling pairs of a high side FET and a low side FET repeats to drive the motor 110. Further, in some embodiments, the control signals provided to one or both FETs of each pair are pulse width modulated (PWM) signals having the determined duty cycle.

In step 318, the motor controller detects a motor speed measured by the Hall sensors 215. For example, the number of pulses per minute provided by the Hall sensors 215 is proportional to and indicates the RPM of the motor 110. In step 320, the motor controller 220 compares the measured motor speed to the desired speed indicated by the combination of user input from the paddle member 162 and the motor-speed limit selector 120. The comparison may produce a difference value between the actual speed and the desired speed.

In step 322, the motor controller 220 adjusts the PWM duty cycle to maintain the desired motor speed indicated by the user input from the paddle member 162 and the motor-speed limit selector 120. In one embodiment, the motor controller adjusts the speed of the motor based on the difference value between the actual speed and the desired speed. Various feedback methodologies may be used such as proportional-integral (PI) controller, proportional-integral-derivative (PID) controllers, and the like. For example, as the measured motor speed drops below the desired speed, the duty cycle is increases, and as the measured motor speed increases above the desired speed, the duty cycle is decreased. In this manner, the motor controller 220 can adapt to an increased or decreased load on the motor 110 and maintain a desired motor speed.

In step 324, in instances when the motor controller 220 detects a change in speed control indicated by the paddle member 162 and/or the motor-speed limit selector 120, the motor controller 220 proceeds to step 314. In step 324, in instances when the motor controller 220 does not detect a change in speed control indicated by the paddle member 162 or the motor-speed limit selector 120, the motor controller 220 proceeds to step 318.

In other words, the motor controller 220 may drive the speed of the motor 110 according to user depression level of the paddle member 162 until the motor speed reaches the user set speed limit set at the motor-speed limit selector 120. The motor controller 220 maintains the motor speed according to the user settings based on feedback from the Hall sensors 215 until the paddle member 162 is released or power is disconnected.

Although embodiments have been described in detail with reference to certain constructions, variations and modifications exist within the scope and spirit of one or more independent aspects of the embodiments as described.

What is claim is:

1. A power tool, comprising:
   a motor configured to rotatably drive an output shaft coupled to the motor;
   a variable motor speed control input;
   a motor speed limit input; and
   a motor controller connected to the variable motor speed control input and the motor speed limit input, the motor controller including an electronic processor and a memory configured to store instructions that when executed by the motor controller configures the motor controller to:
      detect a motor speed limit from a setting of the motor speed limit input, wherein the motor speed limit input includes a push button mechanism configured to be settable to allow a user to select the motor speed limit from a plurality of motor speed limits,
      detect a variable speed control setting from the variable motor speed control input,
      generate a motor speed control signal for driving the motor based on the detected motor speed limit and the detected variable motor speed control setting; and
      transmit the motor speed control signal to a motor driver circuit configured to drive the motor at a speed based on the motor speed control signal
   wherein the motor speed limit is an RPM value of the motor that is not to be exceeded based on a rating of an accessory attached to the tool.

2. The power tool of claim 1, further comprising a motor speed sensor.

3. The power tool of claim 2, wherein the motor controller is further configured to:

detect a measured motor speed using the motor speed sensor;

compare the measured motor speed to a desired speed based on the motor speed limit setting and the variable motor speed control setting to determine a difference value;

generate an adjusted motor speed control signal based on the difference value; and transmit the adjusted motor speed control signal to the motor driver circuit.

4. The power tool of claim 1, wherein the motor speed control signal is a pulse width modulation (PWM) signal.

5. The power tool of claim 1, wherein the variable motor speed control input is a depressible paddle member connected to a microswitch.

6. The power tool of claim 1, wherein the power tool is a right angle die grinder or an inline die grinder.

7. The power tool of claim 1, further comprising a tool holder coupled to the output shaft and configured to attach the accessory to the power tool.

8. A method for operating a power tool, comprising:
detecting, by a motor controller, a motor speed limit setting output from a motor speed limit input device, wherein the motor speed limit setting output is a maximum RPM rating based on an accessory attached to the tool holder;

detecting, by the motor controller, a variable speed control setting output from a variable motor speed control input device;

generating, by the motor controller, a motor speed control signal for driving a motor configured to rotatably drive an output shaft coupled to the motor; and transmitting the motor speed control signal to a motor drive circuit to drive the motor at a speed based on the motor speed control signal, wherein the motor speed control signal is generated based on the motor controller indexing a value of the variable speed control setting output against a reference value associated with the motor speed limit setting output in a lookup table stored in a memory of the motor controller.

9. The method of claim 8, further comprising:
detecting, by the motor controller, a measured motor speed from a motor speed sensor;

comparing, by the motor controller, the measured motor speed to a desired speed based on the motor speed limit setting and the variable motor speed control setting to determine a difference value;

determining, by the motor controller, an adjusted motor speed control signal to maintain the desired motor speed based on the difference value; and transmitting, by the motor controller, the adjusted motor speed control signal to drive the motor according to the motor speed limit setting and the variable speed control setting.

10. The method of claim 8, wherein the motor speed control signal is a pulse width modulation (PWM) signal.

11. The method of claim 8, wherein the variable motor speed control input device includes a depressible paddle member connected to a microswitch.

12. The method of claim 8, further comprising selecting the motor speed limit from a plurality of motor speed limits using the motor speed limit input device, wherein the motor speed limit input device includes a push button mechanism.

13. The method of claim 8, wherein the power tool is a right angle die grinder or an inline die grinder.

14. The method of claim 8, further comprising attaching the accessory to the power tool using a tool holder connected to the output shaft of the motor.

15. A rotary power tool, comprising:
a motor configured to rotatably drive an output shaft coupled to the motor;

a variable motor speed control input device;

a motor speed limit input device;

a motor speed sensor; and a motor controller in communication with the variable motor speed control input device, the motor speed limit input device, and the motor speed sensor, the motor controller including an electronic processor and a memory configured to store instructions that when executed by the motor controller configures the motor controller to:
detect a motor speed limit from a setting of the motor speed limit input device, wherein the motor speed limit is a maximum RPM value for an attached accessory, detect a variable speed control setting from the variable motor speed control input device, detect a measured motor speed using the motor speed sensor, generating a desired speed value by indexing the detected variable speed control setting against the detected motor speed limit in a lookup table, wherein the lookup table is associated with the detected motor speed limit;

compare the measured motor speed to the desired speed to determine a difference value, generate a motor speed control signal based on the difference value, and transmit the motor speed control signal to a motor driver circuit.

16. The rotary power tool of claim 15, wherein the motor driver circuit comprises one or more Field Effect Transistors.

17. The rotary power tool of claim 16, wherein the motor speed control signal is a pulse width modulation (PWM) signal.

\* \* \* \* \*